(12) United States Patent
Miglavs

(10) Patent No.: US 9,205,986 B2
(45) Date of Patent: Dec. 8, 2015

(54) CONVEYOR CHAIN LINK, CONVEYOR CHAIN, DRIVE WHEEL FOR A CONVEYOR CHAIN AND A SYSTEM COMPRISING SUCH A DRIVE WHEEL

(71) Applicant: FlexLink AB, Göteborg (SE)

(72) Inventor: Peter Miglavs, Tollered (SE)

(73) Assignee: FlexLink AB (SE)

( * ) Notice: Subject to any disclaimer, the term of this patent is extended or adjusted under 35 U.S.C. 154(b) by 0 days.

(21) Appl. No.: 14/381,147

(22) PCT Filed: Mar. 20, 2013

(86) PCT No.: PCT/SE2013/050307
§ 371 (c)(1),
(2) Date: Aug. 26, 2014

(87) PCT Pub. No.: WO2013/141806
PCT Pub. Date: Sep. 26, 2013

(65) Prior Publication Data
US 2015/0008101 A1    Jan. 8, 2015

(30) Foreign Application Priority Data
Mar. 20, 2012  (SE) ...................................... 1250272

(51) Int. Cl.
*B65G 17/08*   (2006.01)
*B65G 23/06*   (2006.01)
(Continued)

(52) U.S. Cl.
CPC .............. *B65G 17/086* (2013.01); *B65G 15/30* (2013.01); *B65G 17/385* (2013.01); *B65G 23/06* (2013.01)

(58) Field of Classification Search
CPC ...... B65G 17/08; B65G 17/086; B65G 21/22; B65G 23/06; B65G 17/385; B65G 15/30
See application file for complete search history.

(56) References Cited

U.S. PATENT DOCUMENTS 2,114,146 A    4/1938   Klein et al.
4,893,709 A    1/1990   Schroeder et al.
(Continued)

FOREIGN PATENT DOCUMENTS

DE    10151863 A1    5/2003
EP     0066530 A1   12/1982
(Continued)

OTHER PUBLICATIONS

"International Application Serial No. PCT/SE2013/050307, International Preliminary Report of Patentability dated Mar. 7, 2014", 6 pgs.
(Continued)

*Primary Examiner* — Leslie A Nicholson, III
*Assistant Examiner* — Keith R Campbell
(74) *Attorney, Agent, or Firm* — Schwegman Lundberg & Woessner, P.A.

(57) ABSTRACT

A conveyor chain link provided with an upper body having a carrying surface and a lower body having a front end and a rear end, where the rear end is provided with a first leg and a second leg arranged at a certain distance from each other such that the front end of a chain link fits between the first and second legs of an adjacent chain link when mounted in a conveyor chain, wherein a first protrusion of the first leg is provided with a first tab extending towards the front end and a second protrusion of the second leg is provided with a second tab extending towards the front end, where the bearing surfaces of the tabs are parallel with the carrying surface of the upper body.

14 Claims, 3 Drawing Sheets

(51) Int. Cl.
*B65G 17/38* (2006.01)
*B65G 15/30* (2006.01)

(56) References Cited

U.S. PATENT DOCUMENTS

| | | | |
|---|---|---|---|
| 5,402,880 A | 4/1995 | Murphy | |
| 6,364,094 B1 | 4/2002 | Alstmar | |
| 6,871,736 B2 * | 3/2005 | Fandella | 198/853 |
| 7,779,990 B2 * | 8/2010 | Ferrari et al. | 198/688.1 |
| 7,896,766 B2 * | 3/2011 | Mitzschke et al. | 474/206 |
| 8,505,715 B2 * | 8/2013 | Andreoli et al. | 198/852 |
| 8,844,712 B2 * | 9/2014 | Ooi et al. | 198/838 |
| 2004/0050672 A1 | 3/2004 | Baier et al. | |
| 2015/0060243 A1 * | 3/2015 | Abbestam | 198/853 |

FOREIGN PATENT DOCUMENTS

| | | |
|---|---|---|
| FR | 2629804 A1 | 10/1989 |
| WO | WO-2013/141806 A1 | 9/2013 |

OTHER PUBLICATIONS

"International Application Serial No. PCT/SE2013/050307, International Search Report mailed Jul. 5, 2013", 5 pgs.

* cited by examiner

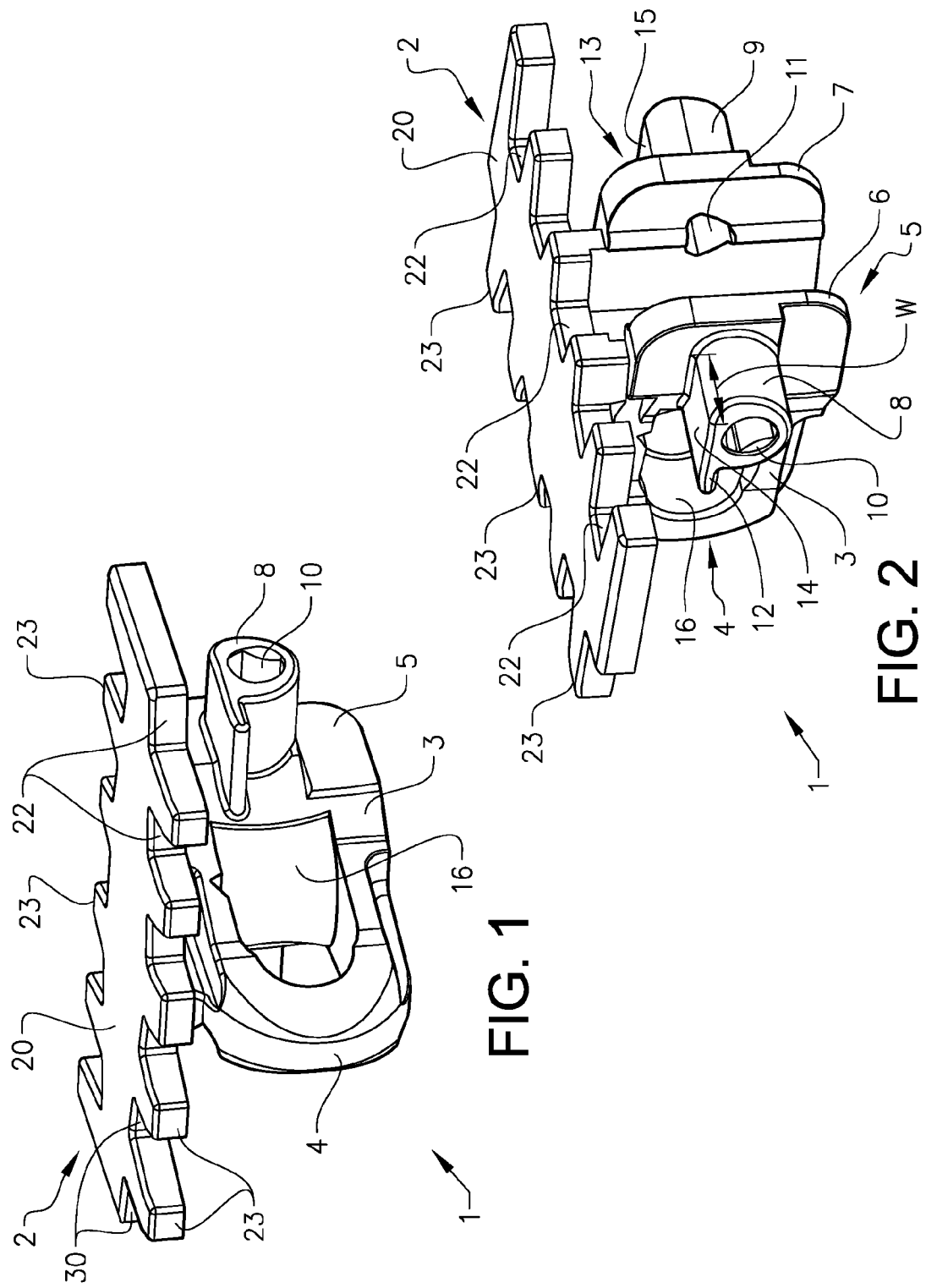

CONVEYOR CHAIN LINK, CONVEYOR CHAIN, DRIVE WHEEL FOR A CONVEYOR CHAIN AND A SYSTEM COMPRISING SUCH A DRIVE WHEEL

RELATED APPLICATIONS

This application is a US National Stage application filed under 35 U.S.C. §371 from International Application Serial No. PCT/SE2013/050307, filed Mar. 20, 2013 and published as WO 2013/141806 A1 on Sep. 26, 2013, which claims the priority benefit of Sweden Patent Application No.: 1250272-0, filed Mar. 20, 2012, the contents of which applications and publication are incorporated herein by reference in their entirety.

TECHNICAL FIELD

The present invention relates to a conveyor chain link having an improved wear resistance, a conveyor chain comprising a plurality of such conveyor chain links and a drive wheel adapted for such a conveyor chain. The conveyor chain link is adapted to be used in a conveyor system comprising an endless chain.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via supporting means. Larger objects are often conveyed on supporting means also known as pallets, and smaller objects may be conveyed using a small carrier often referred to as a carrier puck.

The conveyor chain is forwarded by a drive unit comprising a motor. The conveyor chains runs in conveyor beams and glides on slide rails attached to the conveyor beams. Both the conveyor chain and the slide rails may be made from a low friction material in order to reduce power consumption, to reduce wear and to reduce noise caused by vibrations. In the forward direction, i.e. when the chain transports objects, the underside of the upper body bears on upper slide rails of the conveyor beam. In the return direction, i.e. when the chain travels upside down in the return path, the upper side of the conveyor chain may be supported by a bearing surface on which the conveyor chain glides. The conveyor chain may also be provided with tabs or protrusions by which the chain may bear on an inner slide rail of the conveyor beam.

One problem with a sliding contact between the conveyor chain and the conveyor beams is that friction is created. The use of low friction materials in the chain links and in the slide rails reduces the friction. It is however not always possible to select a low friction material for the conveyor chain. Further, dust and other particles may set on the contact surfaces which lead to a higher friction and thus to a higher wear. Further, the sliding contact induces noise.

In U.S. Pat. No. 5,402,880 an article carrying chain is disclosed. The chain is to be used in an article conveyor and it includes a plurality of interconnected molded plastic chain link assemblies each having a planar top plate. A plurality of upper and lower tabs formed along the lower portions of the chain link assemblies serve to guide the chain relative to a pair of guide rails of the conveyor frame while permitting free removal of the chain link assemblies from the guide rails at selected areas along the length of the conveyor and also restraining the chain between the guide rails at other portions of the conveyor such as at curves or vertical bends.

U.S. Pat. No. 6,364,094 discloses a conveyor system comprising a conveyor chain, a chain guidance means and a guide support means. Each chain link comprise a link member, a connecting pin and a bearing element. The link members are provided with protrusions having through holes, adapted to hold the connection pin for the conveyor chain. Further, the conveyor chain will slide on the protrusions in the return path.

FR 2629804 and DE 101 51 863 describe further examples of similar conveyor chains.

These solutions work fine in some systems, but are anyhow subjected to the above mentioned problem. There is thus still room for improvements.

DISCLOSURE OF INVENTION

An object of the invention is therefore to provide an improved chain link that allows for a reduced wear. A further object is to provide an improved chain link that will reduce induced noise in a conveyor system. A further object of the invention is to provide a drive wheel that is capable of driving a conveyor chain comprising a plurality of inventive chain links.

The solution to the problem according to the invention is described in the characterizing part of claim 1 for the chain link. Further claims are directed to a conveyor chain, a drive wheel and advantageous embodiments and further developments of the chain link.

In a conveyor chain link provided with an upper body having a carrying surface, and a lower body having a front end and a rear end, where said rear end is provided with a first leg and a second leg arranged at a certain distance from each other such that the front end of a chain link fits between the first and second legs of an adjacent chain link, where said first leg has a first protrusion facing outwards from said first leg and where said second leg has a second protrusion arranged opposite said first protrusion and facing outwards from said second leg, where said first protrusion is provided with a first through hole and said second protrusion is provided with a second through hole being coaxial with the first through hole, where the first and second through holes are adapted to hold a connecting pin, the object of the invention is achieved in that the first protrusion is provided with a first tab extending towards the front end and the second protrusion is provided with a second tab extending towards the front end, where the bearing surfaces of the tabs are parallel with the carrying surface of the upper body.

By this first embodiment of the chain link according to the invention, the chain link will provide a larger and longer bearing surface for the conveyor chain when the conveyor chain travels in the return path. The larger bearing surface will in turn provide for a lower surface pressure which will reduce the friction and thus also save energy. Further, the elongated bearing surface will allow for a reduction of the noise induced by the conveyor chain. The reduction of induced noise is due to the fact that the bearing surface is longer in the travel direction of the chain, which allows for a more stable transportation of the chain links. The larger bearing surface comprises more material which will prolong the life of the chain link due to wear.

In an advantageous development of the invention, the length of the tab is greater than the radius of the protrusions. In this way, the length of the bearing surface will be longer than for a chain link without a tab, which will allow for a reduced friction, reduced wear and a reduced noise induction.

In an advantageous development of the invention, the thickness of the tab is greater than the lower wall thickness of the protrusions. Preferably, the thickness of the tab is greater than or equal to the upper wall thickness of a protrusion. In this way, more material is provided at the bearing surface of the tab which will prolong the life of the chain link.

In the inventive drive wheel, each notch is adapted to fit a chain link having a tab. Each notch is thus provided with a cut-out, where the size of the cut-out is larger than the tab of the protrusions of each chain link. In this way, a conveyor chain comprising tabs can be driven in a secure and reliable way.

BRIEF DESCRIPTION OF DRAWINGS

The invention will be described in greater detail in the following, with reference to the embodiments that are shown in the attached drawings, in which FIG. 1 shows a front perspective side view of a chain link according to the invention, FIG. 2 shows a rear perspective side view of a chain link according to the invention.

MODES FOR CARRYING OUT THE INVENTION

Figure 3:
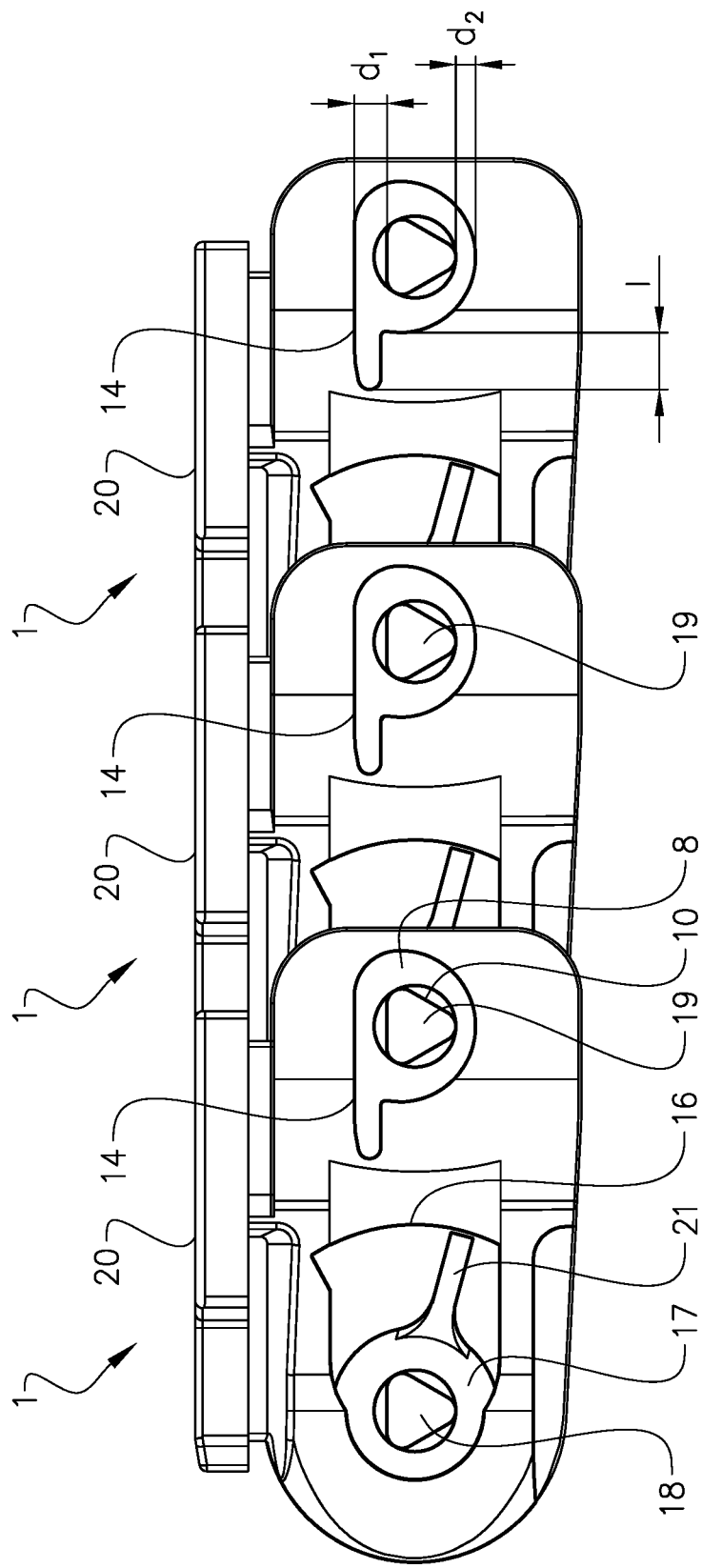
FIG. 3 shows a side view of a conveyor chain according to the invention.

The embodiments of the invention with further developments described in the following are to be regarded only as examples and are in no way to limit the scope of the protection provided by the patent claims.

In FIGS. 1 and 2, a chain link 1 which can form a part of a conveyor chain is shown. The chain link has an upper body 2 with an upper carrying surface 20 adapted to carry objects that are to be conveyed. The upper carrying surface is preferably shaped like a substantially flat surface having a plurality of notches 22 and teeth 23 arranged adjacent to the front end 4 and the rear end 5. The notches and the teeth are arranged to mesh with the corresponding notches and teeth of an adjacent chain link.

The chain link is further provided with a lower body 3 which has a front end 4 and a rear end 5. The front end 4 has a substantially spherical bearing seat 16 which is arranged to cooperate with a bearing element 17 by partly embracing the bearing element which can be seen in FIG. 3. The rear end 5 has a first leg 6 and a second leg 7 arranged at a certain distance from each other, with the legs bifurcating out from the front end 4. The distance between the first leg and the second leg is such that the front end of a chain link fits between the first and second legs of an adjacent chain link when mounted in a conveyor chain.

The first leg 6 has a first protrusion 8 arranged substantially perpendicular to the travelling direction of the conveyor chain and facing outwards from the first leg. The protrusion is advantageously utilized as transport facilitating means, i.e. used as engagement means for cooperation with a drive wheel or the like, for example interacting with a cog wheel of a conveyor drive unit. The protrusion is further advantageously adapted to function as a sliding surface bearing on a slide rail in the return path of a conveyor chain. The first protrusion 8 has a first through hole 10 of a non-circular cross-section, preferably substantially triangular, even though other shapes are also plausible. The second leg 7 has a second protrusion 9 arranged opposite to the first protrusion 8 and facing outwards from the second leg. The second protrusion 9 has a second through hole 11 substantially coaxial with the first through hole 10 of the first protrusion 8 and of the same cross-section. The protrusions extend uniformly such that the protrusions resemble a tube shaped protrusion. In this way, the connecting pin adapted to be inserted into the through holes will be securely fastened due to the large contact surface of the protrusion.

The bearing element 17 is partly shown in FIG. 3 and comprises a substantially spherical main body having a third through hole 18 of a non-circular cross-section corresponding to the cross-section of the first through hole 10 and the second through hole 11. The bearing element 17 is arranged between the first leg 6 and the second leg 7. A force absorbing element 21 is arranged on the side of the bearing element 17 which faces the rear end 5 of the chain link 1. A connecting pin 19 is arranged to be inserted into the three through holes 10, 11, 18 to securely hold the bearing element 17 in position in the travelling direction of the conveyor chain. The cross-sectional shape of the connecting pin 19 corresponds to the cross-section of the three through holes 10, 11, 18. The two ends of the connecting pin 19 may advantageously be chamfered to facilitate insertion into the through holes. In this way, a conveyor chain is securely held together by the bearing elements and the connecting pins.

The cross-section of the through holes 10, 11, 18 and the connecting pin 19 is advantageously substantially triangular. By shaping the through holes such that a flat part of the triangular hole is parallel with the upper carrying surface, the amount of material at the bearing surface 14, 15 of a protrusion can be maximized. The upper thickness $d_1$ of a protrusion can thus be made larger than the lower thickness $d_2$ of a protrusion where a pointed part of the triangular hole is positioned.

The protrusion 8 is further provided with a tab 12 extending towards the front end 4 of the chain link. The tab extends from the upper side of the protrusion and the main purpose of the tab is to extend the bearing surface 14 of the protrusion along the travel direction of the conveyor chain. The bearing surface 14 is parallel with the upper carrying surface 20. The width of the tab is preferably the same as the width of the protrusion. The length l of the tab is preferably in the same range as the radius of the protrusion. In this way, the bearing surface 14 is enlarged. The protrusion 9 is provided with a tab 13 in the same way.

The tab gives several advantages compared with conventional chain links. The tab provides a larger bearing surface for the conveyor chain which will provide for a lower surface pressure. The lower surface pressure will reduce the friction and thus the wear on the bearing surface. The reduced friction will in turn save energy. Further, the enlarged and elongated bearing surface will allow for a reduction of the noise induced by the conveyor chain, since the longer bearing surface of the chain link will allow for a more stable transportation of the chain links with less vibration. Since the larger bearing surface comprises more material, the life of the chain link will be prolonged, i.e. more material has to be worn off before the chain link must be replaced. The tab can also be used as a wear indicator. By detecting when the chain link is worn such that the tab is worn off, an indication that the chain link needs to be replaced is provided. The detection can be made visually by an operator or a photo detector can be mounted in the conveyor system.

By manufacturing the conveyor chain link of a material having a low coefficient of friction, such as an acetal plastic and/or polyamide, a cost advantage and a more favorable modulus of elasticity is achieved.

A plurality of conveyor chain links are attached to each other as shown in FIG. 3 in order to create a conveyor chain. Such a conveyor chain is adapted to travel in a conveyor beam provided with slide rails. One or more conveyor chains with conveyor beams make up a conveyor system, which may also comprise other functional elements, such as diverters, stops, drive units, handling stations etc. The conveyor system is used for moving objects between different stations in e.g. a factory. The objects are conveyed by the conveyor chain, either directly or via supporting means, which are also known as pucks or pallets. Such conveyor systems are well known in the art.

Figure 4:
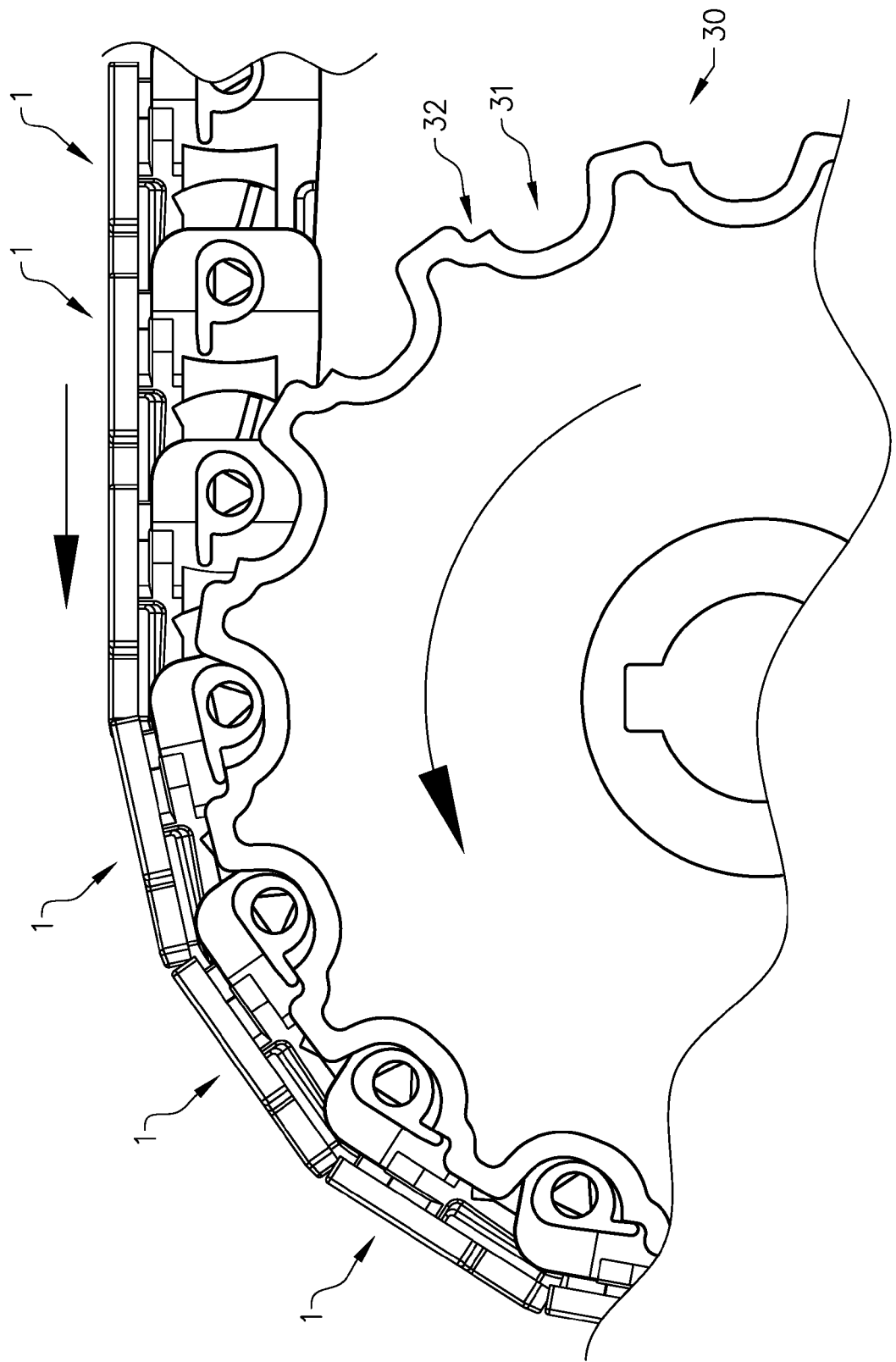
FIG. 4 shows a perspective side view of a drive wheel according to the invention.

FIG. 4 shows a drive wheel comprised in a drive unit of a conveyor system. The drive wheel is adapted to drive a conveyor chain comprising chain links having protrusions which are provided with tabs, as described above. The drive wheel 30 is provided with notches 31 along the circumference of the drive wheel. The notches are semi-circular and will engage with each protrusion of the conveyor chain in order to drive the conveyor chain. Each notch 31 is provided with a small cut-out 32 at one side of the notch such that the tab of the chain link can fit in the cut-out. The cut-out is advantageously larger than the tab such that the tab will not touch the walls of the cut-out. In this way, the protrusions of the chain link will take up the load from the drive wheel when the conveyor chain is driven. A further advantage of this solution is that conventional conveyor chains, where the protrusions are not provided with tabs, can also be driven by the same drive wheel. The drive wheel is preferably manufactured from a metal material which is relatively wear-resistant.

The invention is not to be regarded as being limited to the embodiments described above, a number of additional variants and modifications being possible within the scope of the subsequent patent claims.

REFERENCE SIGNS

1: Conveyor chain link
2: Upper body
3: Lower body
4: Front end
5: Rear end
6: First leg
7: Second leg
8: First protrusion
9: Second protrusion
10: First through hole
11: Second through hole
12: First tab
13: Second tab
14: First bearing surface
15: Second bearing surface
16: Bearing seat
17: Bearing element
18: Through hole
19: Connecting pin
20: Carrying surface
21: Force absorbing element
22: Notches
23: Teeth
30: Drive wheel
31: Notch
32: Cut-out

The invention claimed is:

1. A conveyor chain link comprising:
an upper body having a carrying surface, and
a lower body having a front end and a rear end,
where said rear end is provided with a first leg and a second leg arranged at a certain distance from each other such that the front end of a chain link fits between the first and second legs of an adjacent chain link,
where said first leg has a first protrusion facing outwards from said first leg and where said second leg has a second protrusion arranged opposite said first protrusion and facing outwards from said second leg,
where said first protrusion is provided with a first through hole and said second protrusion is provided with a second through hole being coaxial with the first through hole, where the first and second through holes are adapted to hold a connecting pin,
wherein the first protrusion is provided with a first tab extending towards the front end and the second protrusion is provided with a second tab extending towards the front end, where the bearing surfaces of the tabs are parallel with the carrying surface of the upper body.

2. The conveyor chain link according to claim 1, wherein a length of a tab is greater than the radius of a protrusion.

3. The conveyor chain link according to claim 1, wherein a thickness of a tab is greater than a lower wall thickness of a protrusion.

4. The conveyor chain link according to claim 1, wherein a thickness of a tab is greater than or equal to an upper wall thickness of a protrusion.

5. The conveyor chain link according to claim 1, wherein a width of a tab is substantially the same as a width of a protrusion.

6. The conveyor chain link according to claim 1, wherein said chain link is manufactured of a material having a low coefficient of friction.

7. The conveyor chain link according to claim 6, wherein the material having the low coefficient of friction is an acetal plastic.

8. The conveyor chain link according to claim 6, wherein the material having the low coefficient of friction is a polyamide.

9. A conveyor chain comprising:
a plurality of conveyor chain links, wherein at least one of the conveyor chain links comprises:
an upper body having a carrying surface, and
a lower body having a front end and a rear end,
where said rear end is provided with a first leg and a second leg arranged at a certain distance from each other such that the front end of a chain link fits between the first and second legs of an adjacent chain link,
where said first leg has a first protrusion facing outwards from said first leg and where said second leg has a second protrusion arranged opposite said first protrusion and facing outwards from said second leg,
where said first protrusion is provided with a first through hole and said second protrusion is provided with a second through hole being coaxial with the first through hole, where the first and second through holes are adapted to hold a connecting pin,
wherein the first protrusion is provided with a first tab extending towards the front end and the second protrusion is provided with a second tab extending towards the front end, where the bearing surfaces of the tabs are parallel with the carrying surface of the upper body.

10. The conveyor chain according to claim 9, wherein the conveyor chain further comprises a plurality of bearing elements positioned in the front end of each conveyor chain link, and a plurality of connecting pins extending through the first and second through holes of the chain link and further extending through a hole in the bearing element.

11. A drive wheel comprising:
a plurality of notches, where each notch is semi-circular and is provided with a cut-out, where the cut-out is adapted to fit a protrusion of a chain link, the chain link comprising:
an upper body having a carrying surface, and
a lower body having a front end and a rear end,
where said rear end is provided with a first leg and a second leg arranged at a certain distance from each other such that the front end of a chain link fits between the first and second legs of an adjacent chain link,
where said first leg has a first protrusion facing outwards from said first leg and where said second leg has a second protrusion arranged opposite said first protrusion and facing outwards from said second leg,
where said first protrusion is provided with a first through hole and said second protrusion is provided with a second through hole being coaxial with the first through hole, where the first and second through holes are adapted to hold a connecting pin,
wherein the first protrusion is provided with a first tab extending towards the front end and the second protrusion is provided with a second tab extending towards the front end, where the bearing surfaces of the tabs are parallel with the carrying surface of the upper body.

12. The drive wheel according to claim 11, wherein the cut-out is larger than a tab of a protrusion of the chain link.

13. A conveyor system comprising:
a conveyor chain adapted to travel in a conveyor beam, the conveyor chain comprising a plurality of conveyor chain links, wherein at least one of the conveyor chain links comprise:
an upper body having a carrying surface, and
a lower body having a front end and a rear end,
where said rear end is provided with a first leg and a second leg arranged at a certain distance from each other such that the front end of a chain link fits between the first and second legs of an adjacent chain link,
where said first leg has a first protrusion facing outwards from said first leg and where said second leg has a second protrusion arranged opposite said first protrusion and facing outwards from said second leg,
where said first protrusion is provided with a first through hole and said second protrusion is provided with a second through hole being coaxial with the first through hole, where the first and second through holes are adapted to hold a connecting pin,
wherein the first protrusion is provided with a first tab extending towards the front end and the second protrusion is provided with a second tab extending towards the front end where the bearing surfaces of the tabs are parallel with the carrying surface of the upper body.

14. The conveyor system according to claim 13, wherein the conveyor system further comprises a drive wheel comprising:
a plurality of notches, where each notch is semi-circular and is provided with a cut-out, where the cut-out is adapted to fit the protrusion of a chain link.

* * * * *